(12) United States Patent
Nishimura et al.

(10) Patent No.: US 10,174,164 B2
(45) Date of Patent: Jan. 8, 2019

(54) TRIAZINE RING-CONTAINING POLYMER AND COMPOSITION FOR FILM FORMATION COMPRISING SAME

(71) Applicant: NISSAN CHEMICAL INDUSTRIES, LTD., Tokyo (JP)

(72) Inventors: Naoya Nishimura, Funabashi (JP); Kei Yasui, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/366,916

(22) PCT Filed: Dec. 20, 2012

(86) PCT No.: PCT/JP2012/082996
§ 371 (c)(1),
(2) Date: Jun. 19, 2014

(87) PCT Pub. No.: WO2013/094663
PCT Pub. Date: Jun. 27, 2013

(65) Prior Publication Data
US 2014/0371367 A1    Dec. 18, 2014

(30) Foreign Application Priority Data
Dec. 20, 2011  (JP) .................................. 2011-278376

(51) Int. Cl.
| | | |
|---|---|---|
| *C08G 73/06* | (2006.01) | |
| *C08G 18/64* | (2006.01) | |
| *C08J 5/18* | (2006.01) | |
| *C08L 79/04* | (2006.01) | |
| *C08G 73/02* | (2006.01) | |
| *C08K 3/22* | (2006.01) | |
| *C09D 179/04* | (2006.01) | |
| *C08G 18/79* | (2006.01) | |
| *C08G 18/80* | (2006.01) | |

(52) U.S. Cl.
CPC ..... *C08G 73/0644* (2013.01); *C08G 18/6415* (2013.01); *C08G 18/792* (2013.01); *C08G 18/80* (2013.01); *C08G 73/026* (2013.01); *C08G 73/0273* (2013.01); *C08J 5/18* (2013.01); *C08K 3/22* (2013.01); *C08L 79/04* (2013.01); *C09D 179/04* (2013.01); *C08J 2379/04* (2013.01); *C08K 2003/2244* (2013.01)

(58) Field of Classification Search
CPC ............................ C08G 83/002–83/006; C08G 73/0644–73/065
See application file for complete search history.

(56) References Cited

U.S. PATENT DOCUMENTS

| | | | | |
|---|---|---|---|---|
| 3,033,842 A | * | 5/1962 | Holtschmidt | ............. C08F 8/00 525/56 |
| 5,200,445 A | * | 4/1993 | Cipolli | ............... C08G 73/0644 524/100 |
| 5,886,130 A | | 3/1999 | Trimmer et al. | |
| 8,710,174 B2 | | 4/2014 | Nishimura et al. | |
| 2009/0318725 A1 | | 12/2009 | Takeuchi | |
| 2010/0280185 A1 | * | 11/2010 | Peretolchin | ........ C08G 73/0644 525/418 |

(Continued)

FOREIGN PATENT DOCUMENTS

| | | | |
|---|---|---|---|
| CN | 101643651 A | | 2/2010 |
| CN | 101880400 A | * | 11/2010 |

(Continued)

OTHER PUBLICATIONS

Zhang, W.; Simanek, E. E.; Dendrimers Based on Melamine. Divergent and Orthogonal, Convergent Synthesis of a G3 Dendrimer. Organic Letters, 2000, vol. 2, pp. 843-845.*

(Continued)

*Primary Examiner* — Stephen E Rieth
(74) *Attorney, Agent, or Firm* — Birch, Stewart, Kolasch & Birch, LLP

(57) ABSTRACT

Provided is a triazine ring-containing hyperbranched polymer comprising the repeating unit structure represented by formula (1) and having one or more triazine ring terminals, said one or more triazine ring terminals being capped with a compound that differs from the diamine compound serving as the starting material for the polymer and has at least two active hydrogen groups. In addition to the polymer itself exhibiting high heat resistance, high transparency, a high refractive index, high light resistance, high solubility, and low volume shrinkage, it is also possible to use the polymer to provide a composition for film formation capable of yielding a thick film having high hardness.

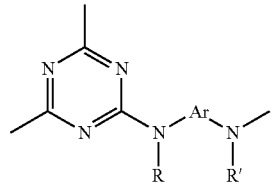

(1)

(In formula (1), R and R' each independently represent a hydrogen atom, an alkyl group, an alkoxy group, an aryl group, or an aralkyl group, and Ar represents a divalent organic group containing an aromatic ring and/or a heterocyclic ring.)

15 Claims, 2 Drawing Sheets

(56) References Cited

U.S. PATENT DOCUMENTS

2012/0049308 A1* 3/2012 Nishimura ......... C08G 73/0273
257/432

FOREIGN PATENT DOCUMENTS

| DE | 19621741 A1 * | 12/1997 | ........... C08G 83/003 |
|---|---|---|---|
| JP | 7-113009 A | 5/1995 | |
| JP | 9-87385 A | 3/1997 | |
| JP | 2000-53659 A | 2/2000 | |
| JP | 2001-503077 A | 3/2001 | |
| JP | 2004-156001 A | 6/2004 | |
| JP | 2007-246877 A | 9/2007 | |
| JP | 2008-24832 A | 2/2008 | |
| WO | WO 2010/128661 A1 | 11/2010 | |

OTHER PUBLICATIONS

Takagi, K.; Hattori, T.; Kunisada, H.; and Yuki, Y. Triazine Dendrimers by Divergent and Convergent Methods. Journal of Polymer Science Part A: Polymer Chemistry, 2000, vol. 38, pp. 4385-4395.*
Machine Translation of CN101643651A. Feb. 10, 2010.*
Machine Translation of DE19621741A1. Dec. 4, 1997.*
Steffensen, M. B.; Simanek, E. E. Chemoselective Building Blocks for Dendrimers from Relative Reactivity Data. Organic Letters, 2003, vol. 5, pp. 2359-2361.*
Steffensen, M. B.; Simanek, E. E. Synthesis and Manipulation of Orthogonally Protected Dendrimers: Building Blocks for Library Synthesis. Angew. Chem. Int. Ed. 2004, vol. 43, pp. 5177-5180.*
Steffensen, M. B.; Hollink, E.; Kuschel, F.; Bauer, M.; Simanek, E. E. Dendrimers Based on [1,3,5]-Triazines. J. Poly. Sci. Part A: Poly. Sci. 2006, vol. 44, pp. 3411-3433.*
Boas, U.; Christensen, J. B.; Heegaard, P. M. H. Dendrimers in Medicine and Biotechnology : New Molecular Tools. Royal Society of Chemistry. RSC Publishing. 2006. pp. 1-27.*
Abbasi, E.; Aval, S. F.; Azkarzadeh, A.; Milani, M.; Nasrabadi, H. T.; Joo, S. W.; Hanifehpour, Y.; Nejati-Koshki, K.; Pashei-Asl, R. Dendrimers: synthesis, applications, and properties. Nanoscale Research Letters, 2014, vol. 9, Issue 247, pp. 1-10.*
Dilly, S. J.; Carlise, S. J.; Clark, A. J.; Shepherd, A. R.; Smith, S. C.; Taylor, P. C.; Marsh, A. Practical synthesis of [1,3,5]triazine dendritic molecules on solid supports. Journal of Polymer Science: Part A: Polymer Chemistry, 2006, vol. 44, pp. 2248-2259.*
Machine Translation of CN101880400A. Nov. 10, 2010. (Year: 2010).*
Mahapatra, S. S. et al. Effect of structure and concentration of polymer, metal ion, and pH of the medium on the fluorescence characteristics of hyperbranched polyamines. Journal of Luminescence, 2008, 128, 1917-1921. (Year: 2008).*
International Search Report, issued in PCT/JP2012/082996, dated Feb. 26, 2013.
Written Opinion of the International Searching Authority, issued in PCT/JP2012/082996, dated Feb. 26, 2013.

* cited by examiner

TRIAZINE RING-CONTAINING POLYMER AND COMPOSITION FOR FILM FORMATION COMPRISING SAME

TECHNICAL FIELD

The present invention relates to a triazine ring-containing polymer and to a film-forming composition containing the same. More particularly, the invention relates to a triazine ring-containing hyperbranched polymer and to a film-forming composition containing the same.

BACKGROUND ART

Various efforts have hitherto been made to increase the functionality of polymeric compounds. For example, in one approach currently used to increase the refractive index of polymeric compounds, aromatic rings, halogen atoms or sulfur atoms are introduced onto the compound. Of such compounds, episulfide polymeric compounds and thiourethane polymeric compounds, both of which have sulfur atoms introduced thereon, are in practical use today as high-refractive index lenses for eyeglasses.

The most effective method for achieving an even higher refractive index in polymeric compounds is known to involve the use of inorganic metal oxides.

For example, a method for increasing the refractive index by using a hybrid material composed of a siloxane polymer mixed with a material containing small dispersed particles of zirconia, titania or the like has been disclosed (Patent Document 1).

A method in which a condensed ring skeleton having a high refractive index is introduced onto portions of a siloxane polymer has also been disclosed (Patent Document 2).

In addition, numerous attempts have been made to impart heat resistance to polymeric compounds. Specifically, it is well known that the heat resistance of polymeric compounds can be improved by introducing aromatic rings. For example, polyarylene copolymers with substituted arylene recurring units on the backbone have been disclosed (Patent Document 3). Such polymeric compounds show promise primarily in use as heat-resistant plastics.

Melamine resins are familiar as triazine resins, but have a very low decomposition temperature compared with heat-resistant materials such as graphite.

The heat-resistant organic materials composed of carbon and nitrogen that have been in use up until now are for the most part aromatic polyimides and aromatic polyamides. However, because these materials have linear structures, their heat-resistance temperatures are not all that high.

Triazine-based condensation materials have also been reported as nitrogen-containing polymeric materials having heat resistance (Patent Document 4).

In recent years, there has arisen a need for high-performance polymeric materials in the development of electronic devices such as liquid-crystal displays, organic electroluminescent (EL) displays, optical semiconductor (LED) devices, solid-state image sensors, organic thin-film solar cells, dye-sensitized solar cells and organic thin-film transistors (TFT).

The specific properties desired in such polymeric materials include (1) heat resistance, (2) transparency, (3) high refractive index, (4) light resistance, (5) high solubility, and (6) low volume shrinkage.

PRIOR ART DOCUMENTS

Patent Documents

Patent Document 1: JP-A 2007-246877
Patent Document 2: JP-A 2008-24832
Patent Document 3: U.S. Pat. No. 5,886,130
Patent Document 4: JP-A 2000-53659
Patent Document 5: International Disclosure WO 2010/128661

SUMMARY OF THE INVENTION

Problems to be Solved by the Invention

In light of the above circumstances, the inventors earlier discovered that hyperbranched polymers containing recurring units with a triazine ring and an aromatic ring are able, with the polymer alone, to achieve a high heat resistance, high transparency, high refractive index, high solubility and low volume shrinkage, and are thus suitable as film-forming compositions in the fabrication of electronic devices (Patent Document 5).

However, in optical material applications, in addition to the above properties, there is also a need for (7) thick film formation and (8) high hardness. Although the material disclosed in Patent Document 5 has a high transparency and a high refractive index, thick-film formation is difficult. Moreover, the film obtained from such a material has an inadequate surface hardness and thus a poor scuff resistance.

It is therefore an object of the present invention to provide a triazine ring-containing hyperbranched polymer which, with the polymer alone, is able to achieve a high heat resistance, high transparency, high refractive index, high light resistance, high solubility and low volumetric shrinkage, and moreover is capable of forming a thick film having a high hardness. Another object of the invention is to provide a film-forming composition which includes such a polymer.

Means for Solving the Problems

The inventors have conducted extensive investigations in order to achieve the above objects. As a result, they have discovered that by combining a hyperbranched polymer in which reactive functional groups have been introduced onto a terminal triazine ring with a crosslinking agent, it is possible to form a thick film having a high hardness.

Accordingly, the invention provides:
1. A triazine ring-containing hyperbranched polymer characterized by including a recurring unit structure of formula (1) below

[Chemical Formula 1]

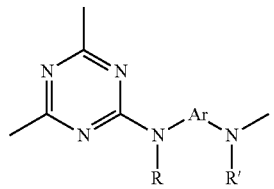

(1)

(wherein R and R' are each independently a hydrogen atom, an alkyl group, an alkoxy group, an aryl group or an aralkyl group; and Ar is a divalent organic group which includes an aromatic ring or a heterocycle or both an aromatic ring and a heterocycle) and having at least one terminal triazine ring, which terminal triazine ring is capped with a compound having at least two active hydrogen groups that differs from a diamine compound serving as a starting material for synthesizing the polymer;

2. The triazine ring-containing hyperbranched polymer according to 1 above, wherein the compound having active hydrogen groups is at least one compound selected from among diamine compounds and amino alcohol compounds;

3. The triazine ring-containing hyperbranched polymer according to 2 above, wherein the compound having active hydrogen groups is an amino alcohol compound;

4. The triazine ring-containing hyperbranched polymer according to any one of 1 to 3 above, wherein Ar is at least one moiety selected from the group consisting of moieties of formulas (2) to (18) below

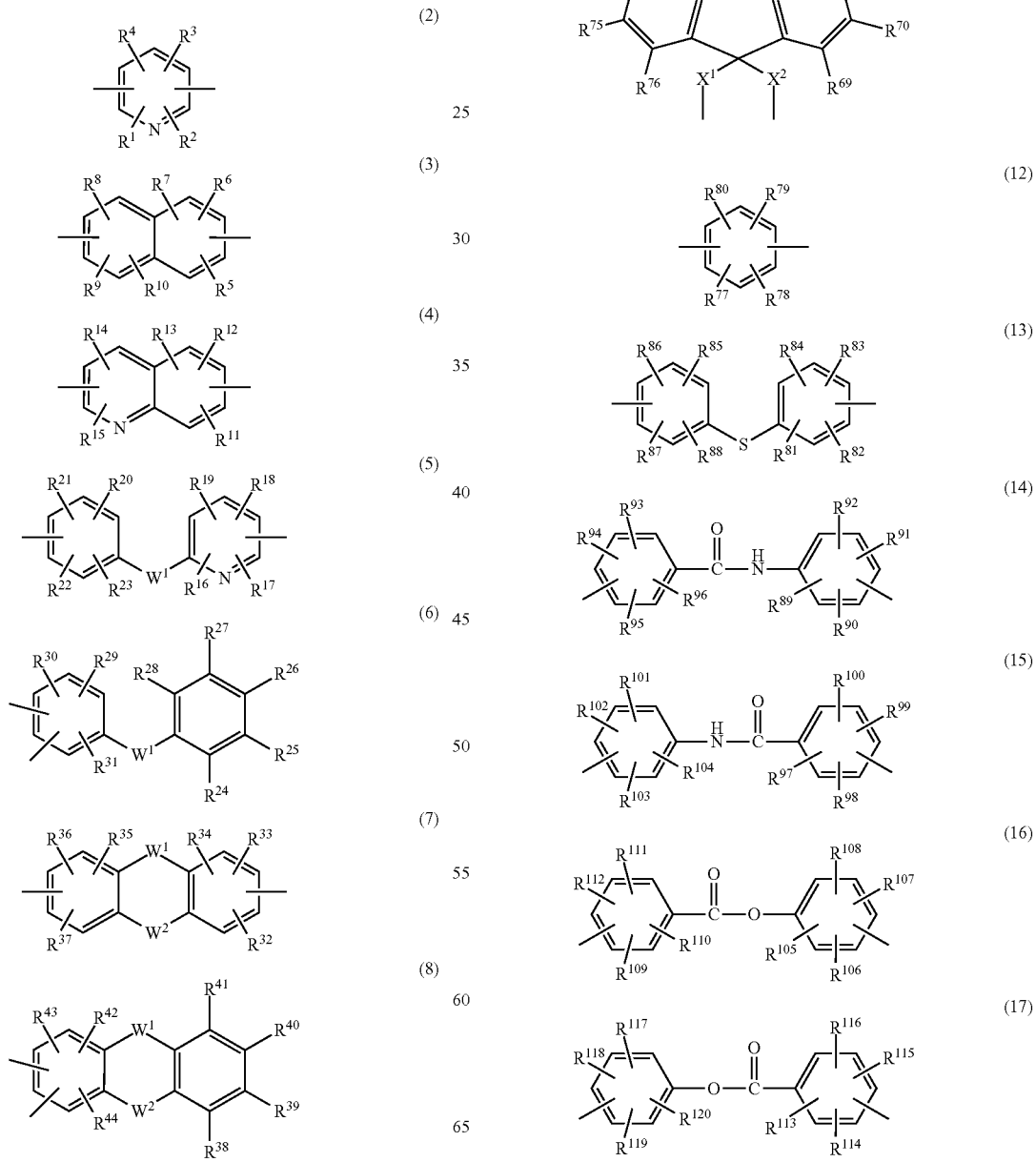

-continued

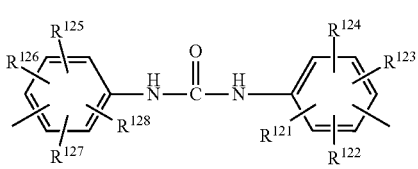
(18)

(wherein $R^1$ to $R^{128}$ are each independently a hydrogen atom, a halogen atom, a carboxyl group, a sulfo group, an alkyl group of 1 to 10 carbons which may have a branched structure, or an alkoxy group of 1 to 10 carbons which may have a branched structure; $W^1$ and $W^2$ are each independently a single bond, $CR^{129}R^{130}$ ($R^{129}$ and $R^{130}$ being each independently a hydrogen atom or an alkyl group of 1 to 10 carbons which may have a branched structure, with the proviso that $R^{129}$ and $R^{130}$ may together form a ring), C=O, O, S, SO, $SO_2$ or $NR^{131}$ ($R^{131}$ being a hydrogen atom or an alkyl group of 1 to 10 carbons which may have a branched structure); and $X^1$ and $X^2$ are each independently a single bond, an alkylene group of 1 to 10 carbons which may have a branched structure, or a group of formula (19) below

[Chemical Formula 3]

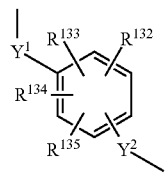
(19)

($R^{131}$ to $R^{135}$ being each independently a hydrogen atom, a halogen atom, a carboxyl group, a sulfo group, an alkyl group of 1 to 10 carbons which may have a branched structure, or an alkoxy group of 1 to 10 carbons which may have a branched structure; and $Y^1$ and $Y^2$ are each independently a single bond or an alkylene group of 1 to 10 carbons which may have a branched structure));

5. The triazine ring-containing hyperbranched polymer according to 4 above, wherein Ar has formula (12);

6. The triazine ring-containing hyperbranched polymer according to 1 above, wherein the recurring unit structure has formula (21) below

[Chemical Formula 4]

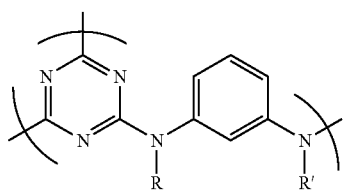
(21)

(wherein R and R' are as defined above);

7. The triazine ring-containing hyperbranched polymer according to 6 above, wherein the recurring unit structure has formula (22) below

[Chemical Formula 5]

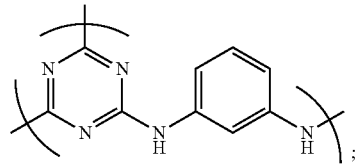
(22)

8. A film-forming composition which includes the triazine ring-containing hyperbranched polymer of any one of 1 to 7 above;

9. The film-forming composition according to 8 above which includes a crosslinking agent;

10. The film-forming composition according to 9 above, wherein the crosslinking agent is at least one compound selected from among compounds containing a blocked isocyanate group and polyfunctional isocyanate compounds;

11. The film-forming composition according to any one of 8 to 10 above which includes a metal oxide;

12. The film-forming composition according to 11 above, wherein the metal oxide is $ZrO_2$;

13. A film which includes the triazine ring-containing hyperbranched polymer according to any one of 1 to 7 above;

14. A film obtained from the film-forming composition of any one of 8 to 12 above; and 15. An optical member having a base material and the film of 13 or 14 above formed on the base material.

Advantageous Effects of the Invention

This invention is able to provide a triazine ring-containing polymer which is capable of achieving by itself a high heat resistance, a high transparency, a high refractive index, a high solubility and a low volume shrinkage, and which moreover is able to produce a thick film having a thickness of at least 2 μm and a high hardness. The invention is also able to provide a film-forming composition which includes such a triazine ring-containing polymer.

Films containing the triazine ring-containing hyperbranched polymer of the invention can be advantageously used as components in the fabrication of electronic devices such as liquid-crystal displays, organic electroluminescent (EL) displays, optical semiconductor (LED) devices, solid-state image sensors, organic thin-film solar cells, dye-sensitized solar cells and organic thin-film transistors (TFT). Such films can also be advantageously used as lens components that are required to have a high refractive index.

Because the polymer of the invention is able to form a thick film having a high hardness, it is especially promising for applications in the field of optical materials.

BRIEF DESCRIPTION OF THE DIAGRAMS

EMBODIMENT FOR CARRYING OUT THE INVENTION

Figure 1:
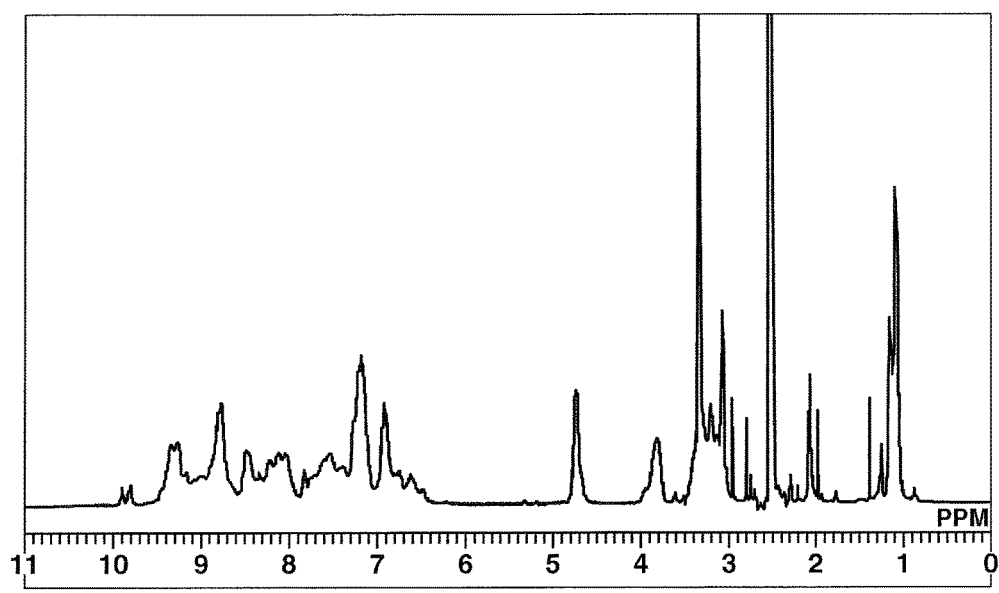
FIG. 1 is an $^1$H-NMR spectrum of Hyperbranched Polymer [3] obtained in Example 1.

The invention is described more fully below.

The triazine ring-containing hyperbranched polymer of the invention includes a recurring unit structure of formula (1) below, and has at least one terminal triazine ring, which terminal triazine ring is capped with a compound having at least two active hydrogen groups that differs from a diamine compound serving as a starting material for synthesizing the polymer.

[Chemical Formula 6]

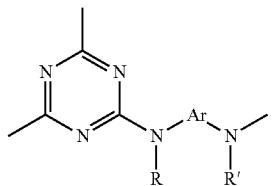

(1)

In the above formula, R and R' are each independently a hydrogen atom, an alkyl group, an alkoxy group, an aryl group or an aralkyl group.

In the invention, the number of carbons on the alkyl group, although not particularly limited, is preferably from 1 to 20. From the standpoint of further increasing the heat resistance of the polymer, the number of carbons is more preferably from 1 to 10, and even more preferably from 1 to 3. The alkyl group may have a linear, branched or cyclic structure.

Illustrative examples of the alkyl group include methyl, ethyl, n-propyl, isopropyl, cyclopropyl, n-butyl, isobutyl, s-butyl, t-butyl, cyclobutyl, 1-methylcyclopropyl, 2-methylcyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2-ethylcyclobutyl, 3-ethylcyclobutyl, 1,2-dimethylcyclobutyl, 1,3-dimethylcyclobutyl, 2,2-dimethylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-isopropylcyclopropyl, 2-isopropylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl and 2-ethyl-3-methylcyclopropyl.

The number of carbons on the alkoxy group, although not particularly limited, is preferably from 1 to 20. From the standpoint of further increasing the heat resistance of the polymer, the number of carbons is more preferably from 1 to 10, and even more preferably from 1 to 3. The alkyl moiety thereon may have a linear, branched or cyclic structure.

Illustrative examples of the alkoxy group include methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy and 1-ethyl-2-methyl-n-propoxy.

The number of carbons on the aryl group, although not particularly limited, is preferably from 6 to 40. From the standpoint of further increasing the heat resistance of the polymer, the number of carbons is more preferably from 6 to 16, and even more preferably from 6 to 13.

Illustrative examples of the aryl group include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl.

The number of carbons on the aralkyl group, although not particularly limited, is preferably from 7 to 20. The alkyl moiety thereon may be linear, branched or cyclic.

Illustrative examples of the aralkyl group include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl.

In above formula (1), Ar is a divalent organic group which includes an aromatic ring or a heterocycle or both an aromatic ring and a heterocycle, and is not otherwise limited. In this invention, Ar is preferably at least one moiety from among those of formulas (2) to (18) below, more preferably at least one moiety from among those of formulas (5) to (18), and even more preferably at least one moiety from among those of formulas (5), (7), (8), (11), (12) and (14) to (18). A moiety of formula (12) is still more preferred.

[Chemical Formula 7]

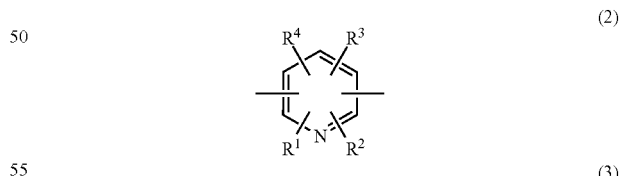

(2)

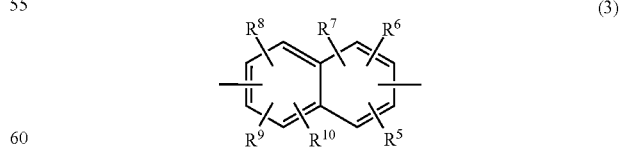

(3)

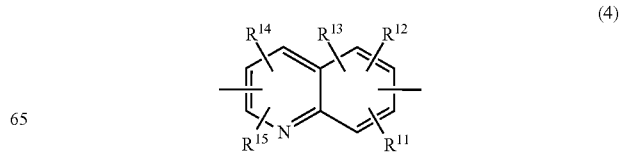

(4)

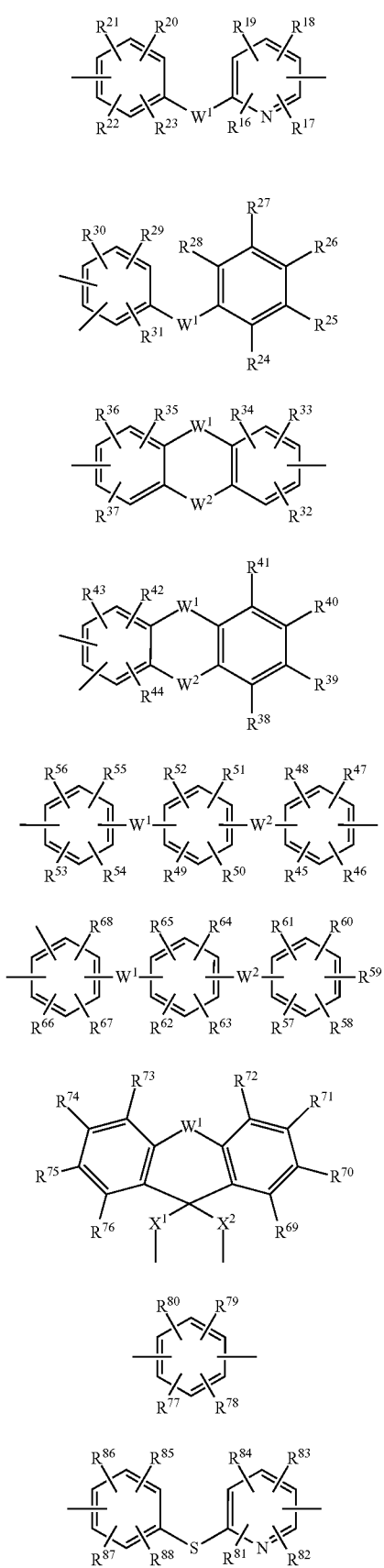
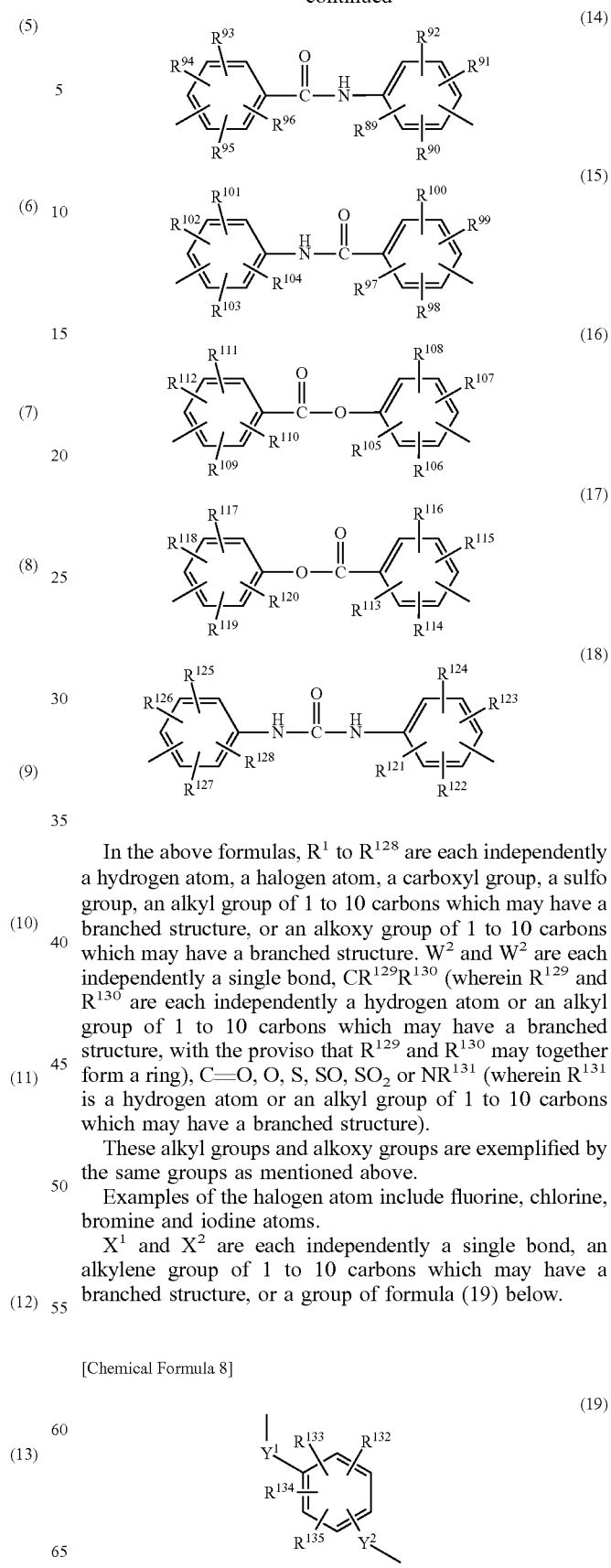

In the above formulas, $R^1$ to $R^{128}$ are each independently a hydrogen atom, a halogen atom, a carboxyl group, a sulfo group, an alkyl group of 1 to 10 carbons which may have a branched structure, or an alkoxy group of 1 to 10 carbons which may have a branched structure. $W^2$ and $W^2$ are each independently a single bond, $CR^{129}R^{130}$ (wherein $R^{129}$ and $R^{130}$ are each independently a hydrogen atom or an alkyl group of 1 to 10 carbons which may have a branched structure, with the proviso that $R^{129}$ and $R^{130}$ may together form a ring), C=O, O, S, SO, $SO_2$ or $NR^{131}$ (wherein $R^{131}$ is a hydrogen atom or an alkyl group of 1 to 10 carbons which may have a branched structure).

These alkyl groups and alkoxy groups are exemplified by the same groups as mentioned above.

Examples of the halogen atom include fluorine, chlorine, bromine and iodine atoms.

$X^1$ and $X^2$ are each independently a single bond, an alkylene group of 1 to 10 carbons which may have a branched structure, or a group of formula (19) below.

[Chemical Formula 8]

In the above formula, $R^{132}$ to $R^{135}$ are each independently a hydrogen atom, a halogen atom, a carboxyl group, a sulfo group, an alkyl group of 1 to 10 carbons which may have a branched structure, or an alkoxy structure of 1 to 10 carbons which may have a branched structure. $Y^1$ and $Y^2$ are each independently a single bond or an alkylene group of 1 to 10 carbons which may have a branched structure.

These halogen atoms, alkyl groups and alkoxy groups are exemplified by the same groups as mentioned above.

Illustrative examples of the alkylene group which may have a branched structure of 1 to 10 carbons include methylene, ethylene, propylene, trimethylene, tetramethylene and pentamethylene.

From the standpoint of further increasing the solubility in solvents having a high safety, such as resist solvents, Ar is preferably an m-phenylenediamine derivative group of formula (20) below.

[Chemical Formula 9]

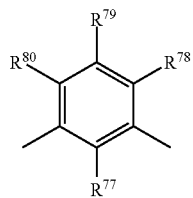

(20)

In the above formula, $R^{77}$ to $R^{80}$ are as defined above, although all are preferably hydrogen atoms.

Accordingly, preferred recurring unit structures which give the polymer a good solubility include those of formula (21) below. In particular, hyperbranched polymers having a recurring unit structure of formula (22) below in which R and R' are both hydrogen atoms are best.

[Chemical Formula 10]

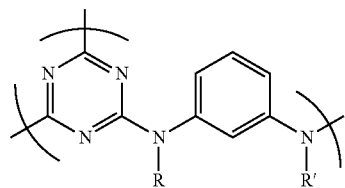

(21)

In the above formula, R and R' are as defined above.

[Chemical Formula 11]

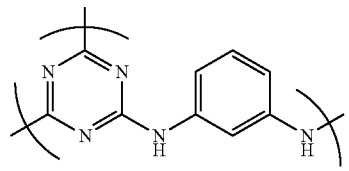

(22)

The hyperbranched polymer of this invention has a weight-average molecular weight which, although not particularly limited, is preferably between 500 and 500,000, and more preferably between 500 and 100,000. To further enhance the heat resistance and lower the shrinkage ratio, the weight-average molecular weight is preferably at least 2,000. To further increase the solubility and lower the viscosity of the resulting solution, the weight-average molecular weight is preferably not more than 50,000, more preferably not more than 30,000, and even more preferably not more than 10,000.

In this invention, "weight-average molecular weight" refers to the weight-average molecular weight measured by gel permeation chromatography (GPC) against a polystyrene standard.

In this invention, the compound having at least two active hydrogen groups which is used to cap the terminal triazine ring on the hyperbranched polymer is not subject to any particular limitation, provided it is capable of reacting with halogen atoms on the triazine ring. However, a compound having two or more active hydrogen groups selected from amino groups, hydroxyl groups and thiol groups is preferred.

In particular, at least one compound selected from among diamine compounds having two amino groups and amino alcohol compounds having one amino group and one hydroxyl group is preferred, an amino alcohol compound is more preferred, and an alkanolamine is still more preferred.

Illustrative examples of such compounds include diamine compounds such as ethylenediamine and 1,3-propanediamine; diol compounds such as ethylene glycol and propylene glycol; dithiol compounds such as 1,2-ethanedithiol and 1,3-propanedithiol; and alkanolamines such as methanolamine, ethanolamine, propanolamine, 1-amino-2-propanol, 1-amino-2-butanol, 1-amino-3-butanol and 4-amino-1-butanol.

Exemplary methods for preparing the triazine ring-containing polymer of the invention are described.

For example, as shown in Scheme 1 below, a highly branched polymer (hyperbranched polymer) (3) in which at least one terminal triazine ring is capped with aminopropanol can be obtained by reacting a cyanuric halide (4) with m-phenylenediamine (5) and 1-amino-2-propanol in a suitable organic solvent.

Alternatively, as shown in Scheme 2 below, a highly branched polymer (hyperbranched polymer) (3) can be synthesized from a compound (6) obtained by reacting equimolar amounts of a cyanuric halide (4) and m-phenylenediamine (5) in a suitable organic solvent, and 1-amino-2-propanol.

Scheme 1

[Chemical Formula 12]

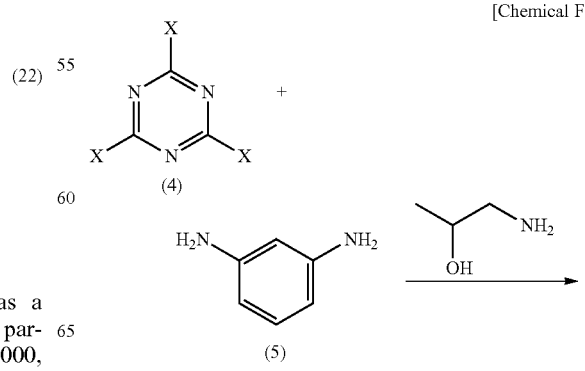

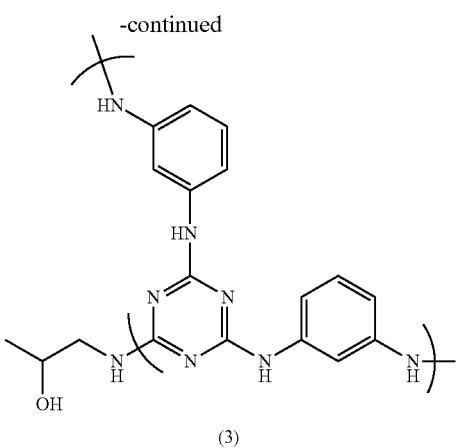

(3)

In the above formulas, each occurrence of X is independently a halogen atom.

Scheme 2

[Chemical Formula 13]

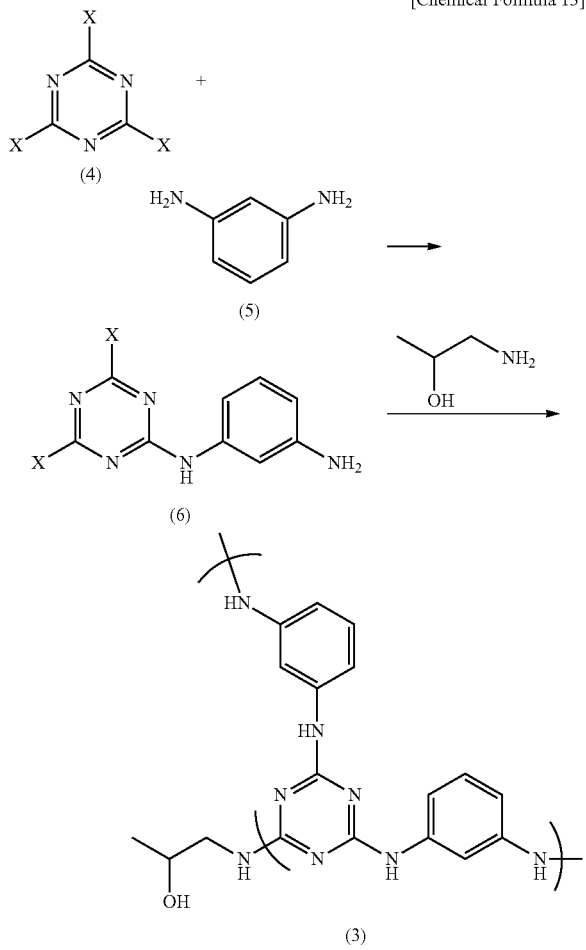

(3)

In the above formulas, each occurrence of X is independently a halogen atom.

In the Scheme 1 method, the respective starting materials are charged in the following amounts. To obtain a highly branched polymer (hyperbranched polymer) having a terminal triazine ring, m-phenylenediamine (5) is used in an amount, per 2 equivalents of the cyanuric halide (4), of preferably less than 3 equivalents, and more preferably at least 0.01 equivalent and less than 3 equivalents.

Also, in the Scheme 1 and 2 reactions, the amount of aminopropanol used per equivalent of the cyanuric halide cannot be strictly specified because it varies according to the ratio in which the cyanuric halide (4) and m-phenylenediamine (5) are used, although this amount is preferably from about 0.1 equivalent to about 10 equivalents, and more preferably from about 1 equivalent to about 10 equivalents.

Various solvents that are commonly used in this type of reaction may be used as the organic solvent. Illustrative examples include tetrahydrofuran, dioxane and dimethylsulfoxide; amide solvents such as N,N-dimethylformamide, N-methyl-2-pryrrolidone, tetramethylurea, hexamethylphosphoramide, N,N-dimethylacetamide, N-methyl-2-piperidone, N,N-dimethylethyleneurea, N,N,N',N'-tetramethylmalonamide, N-methylcaprolactam, N-acetylpyrrolidine, N,N-diethylacetamide, N-ethyl-2-pyrrolidone, N,N-dimethylpropionamide, N,N-dimethylisobutyramide, N-methylformamide and N,N'-dimethylpropyleneurea; and mixed solvents thereof.

Of the above, N,N-dimethylformamide, dimethylsulfoxide, N-methyl-2-pyrrolidone, N,N-dimethylacetamide, and mixed solvents thereof are preferred. N,N-Dimethylacetamide and N-methyl-2-pyrrolidone are especially preferred.

In the Scheme 1 reaction and the second stage reaction in Scheme 2, the reaction temperature may be suitably set in the range of from the melting point of the solvent used to the boiling point of the solvent, although the temperature is preferably from about −50° C. to about 150° C., and more preferably from −20 to 100° C.

In the first-stage reaction of Scheme 2, the reaction temperature may be suitably set in the range of from the melting point of the solvent used to the boiling point of the solvent, with a temperature of from about −50 to about 50° C. being preferred, and a temperature of from about −20 to about 50° C. being more preferred.

In each of the above reactions, the ingredients may be added in any order. However, in the Scheme 1 reaction, the best method is to cool a solution containing the cyanuric halide (4) or m-phenylenediamine (5) and an organic solvent, add m-phenylenediamine (5) or cyanuric halide (4) to the solution at this temperature, then heat within the above temperature range to form a polymer, and subsequently add also 1-amino-2-propanol to effect a reaction.

In this case, either ingredient may be used as the ingredient which is initially dissolved in the solvent or as the ingredient which is subsequently added, although a method wherein the cyanuric halide (4) is added to a solution of m-phenylenediamine (5) is preferred.

Also, in the Scheme 2 reactions, either ingredient may be used as the ingredient which is initially dissolved in the solvent or as the ingredient which is subsequently added, although a method in which m-phenylenediamine (5) is added to a cooled solution of the cyanuric halide (4) is preferred. The best method is one in which the reaction is effected by adding 1-amino-2-propanol within the above temperature range to the intermediate (6)-containing solution obtained in this way.

The subsequently added ingredient may be added neat or may be added as a solution of the ingredient dissolved in an organic solvent such as any of those mentioned above. However, taking into account the ease of the operations and the controllability of the reaction, the latter approach is preferred.

Also, addition may be carried out gradually such as in a dropwise manner, or the entire amount may be added all at once in a batchwise manner.

In the Scheme 1 reaction and the second stage reaction in Scheme 2, various bases which are commonly used may be added during or after polymerization.

Illustrative examples of such bases include potassium carbonate, potassium hydroxide, sodium carbonate, sodium hydroxide, sodium bicarbonate, sodium ethoxide, sodium acetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, ammonia, trimethylamine, triethylamine, diisopropylamine, diisopropylethylamine, N-methylpiperidine, 2,2,6,6-tetramethyl-N-methylpiperidine, pyridine, 4-dimethylaminopyridine and N-methylmorpholine.

The amount of base added per equivalent of the cyanuric halide (4) is preferably from 1 to 100 equivalents, and more preferably from 1 to 10 equivalents. These bases may also be used in the form of an aqueous solution.

Although it is preferable for no starting ingredients to remain in the resulting polymer, some starting material may remain, provided this does not detract from the advantageous effects of the invention.

In the methods of both schemes, following reaction completion, the product can be easily purified by a suitable technique such as reprecipitation.

The film-forming composition of the invention is a composition that includes the above-described hyperbranched polymer. For example, preferred use can be made of a composition obtained by dissolving this hyperbranched polymer in various solvents.

The solvent used for dissolving the polymer may be the same as or different from the solvent used during polymerization. This solvent is not subject to any particular limitation, provided there is no loss of compatibility with the polymer. It is possible to select and use, as desired, either a single solvent or a plurality of solvents.

Illustrative examples of such solvents include toluene, p-xylene, o-xylene, m-xylene, ethylbenzene, styrene, ethylene glycol dimethyl ether, propylene glycol monomethyl ether, ethylene glycol monomethyl ether, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, γ-butyrolactone, acetone, methyl ethyl ketone, methyl isopropyl ketone, diethyl ketone, methyl isobutyl ketone, methyl n-butyl ketone, cyclohexanone, ethyl acetate, isopropyl acetate, n-propyl acetate, isobutyl acetate, n-butyl acetate, ethyl lactate, methanol, ethanol, n-propanol, isopropanol, n-butanol, isobutanol, tert-butanol, 1-pentanol, 2-methyl-2-butanol, 2-methyl-1-butanol, 1-hexanol, cyclohexanol, 2-methyl-1-pentanol, 1-heptanol, 1-octanol, 2-ethylhexanol, 1-methoxy-2-butanol, diacetone alcohol, allyl alcohol, ethylene glycol, propylene glycol, hexylene glycol, trimethylene glycol, furfuryl alcohol, tetrahydrofurfuryl alcohol, benzyl alcohol, diethylene glycol, 1,3-butanediol, 1,4-butanediol, 2,3-butanediol, isopropyl ether, tetrahydrofuran, 1,4-dioxane, N,N-dimethylformamide, N,N-dimethylacetamide, N-methylpyrrolidone, 1,3-dimethyl-2-imidazolidinone, dimethylsulfoxide and N-cyclohexyl-2-pyrrolidinone. From the standpoint of polymer solubility and storage stability, propylene glycol monomethyl ether, propylene glycol monoethyl ether, propylene glycol monomethyl ether acetate, propylene glycol monobutyl ether and cyclohexanone are more preferred.

At this time, the solid content in the film-forming composition is not particularly limited, provided it is in a range that does not exert an influence on the storage stability, and may be suitably set in accordance with the intended thickness of the film. Specifically, from the standpoint of solubility and storage stability, the solid content is preferably from 0.1 to 50 wt %. To form a thicker film, the solid content is preferably from 1 to 30 wt %.

The film-forming composition of the invention may include also other ingredients, such as leveling agents, surfactants and crosslinking agents, provided these do not detract from the advantageous effects of the invention.

Illustrative examples of surfactants include the following nonionic surfactants: polyoxyethylene alkyl ethers such as polyoxyethylene lauryl ether, polyoxyethylene stearyl ether, polyoxyethylene cetyl ether and polyoxyethylene oleyl ether; polyoxyethylene alkylaryl ethers such as polyoxyethylene octylphenol ether and polyoxyethylene nonylphenol ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate and sorbitan tristearate; and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; and additionally include fluorosurfactants such as those available under the trade names Eftop EF301, EF303 and EF352 (from Mitsubishi Materials Electronic Chemicals Co., Ltd. (formerly Jemco Inc.)), Megafac F171, F173, R-08 and R-30 (DIC Corporation), Fluorad FC430 and FC431 (Sumitomo 3M, Ltd.), AsahiGuard AG710 and Surflon S-382, SC101, SC102, SC103, SC104, SC105 and SC106 (Asahi Glass Co., Ltd.); and also the organosiloxane polymers KP341 (Shin-Etsu Chemical Co., Ltd.) and BYK-302, BYK-307, BYK-322, BYK-323, BYK-330, BYK-333, BYK-370, BYK-375 and BYK-378 (BYK-Chemie Japan KK).

These surfactants may be used singly or two or more may be used in combination. The amount of surfactant used per 100 parts by weight of the polymer is preferably from 0.0001 to 5 parts by weight, more preferably from 0.001 to 1 part by weight, and even more preferably from 0.01 to 0.5 part by weight.

The crosslinking agent is not particularly limited, provided it is a compound having a substituent capable of reacting with the hyperbranched polymer of the invention.

Such compounds are exemplified by melamine compounds having a crosslink-forming substituent such as a methylol group or a methoxymethyl group, substituted urea compounds, compounds containing a crosslink-forming substituent such as an epoxy group or an oxetane group, compounds having an isocyanate group, compounds containing a blocked isocyanate group, compounds having an acid anhydride group, compounds having a (meth)acryl group, and phenoplast compounds. From the standpoint of heat resistance and storage stability, a compound containing an epoxy group, a blocked isocyanate group or a (meth)acryl group is preferred.

A blocked isocyanate group is preferred in that, because it crosslinks by forming a urea linkage and has a carbonyl group, the refractive index does not decrease; and also on account of the low-temperature curability and thick film formability.

When used in the treatment of polymer chain ends, it suffices for these compounds to have at least one crosslink-forming substituent; however, when used in crosslinking treatment between polymers, they must have at least two crosslink-forming substituents.

The epoxy compound has at least two epoxy groups on the molecule. Upon exposure of this compound to an elevated temperature during heat curing, the epoxy rings open and the crosslinking reaction proceeds via an addition reaction with the hyperbranched polymer of the invention.

Illustrative examples of the crosslinking agent include tris(2,3-epoxypropyl) isocyanate, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis(N,N-diglycidylaniline), 3,4-epoxycyclohexylmethyl-3,4-epoxycyclohexanecarboxylate, trimethylolethane triglycidyl ether, bisphenol A diglycidyl ether and pentaerythritol polyglycidyl ether.

Examples of commercial products that may be used include epoxy resins having at least two epoxy groups, such as YH-434 and YH-434L (from Tohto Kasei Co., Ltd.); epoxy resins having a cyclohexene oxide structure, such as Epolead GT-401, GT-403, GT-301 and GT-302, and also Celloxide 2021 and Celloxide 3000 (all from Daicel Chemical Industries, Ltd.); bisphenol A-type epoxy resins such as Epikote (now "jER") 1001, 1002, 1003, 1004, 1007, 1009, 1010 and 828 (all from Japan Epoxy Resin Co., Ltd.); bisphenol F-type epoxy resins such as Epikote (now "jER") 807 (Japan Epoxy Resin Co., Ltd.); phenol-novolak type epoxy resins such as Epikote (now "jER") 152 and 154 (Japan Epoxy Resin Co., Ltd.), and EPPN 201 and 202 (Nippon Kayaku Co., Ltd.); cresol-novolak type epoxy resins such as EOCN-102, EOCN-103S, EOCN-104S, EOCN-1020, EOCN-1025 and EOCN-1027 (Nippon Kayaku Co., Ltd.), and Epikote (now "jER") 180S75 (Japan Epoxy Resin Co., Ltd.); alicyclic epoxy resins such as Denacol EX-252 (Nagase ChemteX Corporation), CY175, CY177 and CY179 (Ciba-Geigy AG), Araldite CY-182, CY-192 and CY-184 (Ciba-Geigy AG), Epiclon 200 and 400 (DIC Corporation), Epikote (now "jER") 871 and 872 (Japan Epoxy Resin Co., Ltd.), and ED-5661 and ED-5662 (Celanese Coating KK); and aliphatic polyglycidyl ethers such as Denacol EX-611, EX-612, EX-614, EX-622, EX-411, EX-512, EX-522, EX-421, EX-313, EX-314 and EX-321 (Nagase ChemteX Corporation).

The acid anhydride compound is a carboxylic acid anhydride obtained by carrying out a dehydration/condensation reaction between two carboxylic acid molecules. Upon exposure to an elevated temperature during heat curing, the anhydride ring opens and the crosslinking reaction proceeds by way of an addition reaction with the hyperbranched polymer of the invention.

Illustrative examples of the acid anhydride compound include compounds having a single acid anhydride group on the molecule, such as phthalic anhydride, tetrahydrophthalic anhydride, hexahydrophthalic anhydride, methyl tetrahydrophthalic anhydride, methyl hexahydrophthalic anhydride, nadic anhydride, methyl nadic anhydride, maleic anhydride, succinic anhydride, octyl succinic anhydride and dodecenyl succinic anhydride; and compounds having two acid anhydride groups on the molecule, such as 1,2,3,4-cyclobutanetetracarboxylic dianhydride, pyromellitic anhydride, 3,4-dicarboxy-1,2,3,4-tetrahydro-1-naphthalene-succinic dianhydride, bicyclo[3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3',4,4'-benzophenonetetracarboxylic dianhydride, 3,3',4,4'-biphenyltetracarboxylic dianhydride, 2,2-bis(3,4-dicarboxyphenyl)hexafluoropropane dianhydride and 1,3-dimethyl-1,2,3,4-cyclobutanetetracarboxylic dianhydride.

The (meth)acrylate compound is a compound having two or more (meth)acryl groups on the molecule. Upon exposure to an elevated temperature during heat curing, the crosslinking reaction proceeds by way of an addition reaction with the hyperbranched polymer of the invention.

Illustrative examples of the compound having (meth)acryl groups include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerol triacrylate, ethoxylated glycerol trimethacrylate, ethoxylated pentaerythritol tetraacrylate, ethoxylated pentaerythritol tetramethacrylate, ethoxylated dipentaerythritol hexaacrylate, polyglycerol monoethylene oxide polyacrylate, polyglycerol polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate and 1,6-hexanediol dimethacrylate.

The above compound having (meth)acryl groups may be acquired as a commercial product, illustrative examples of which include NK Ester A-200, A-400, A-600, A-1000, A-TMPT, UA-53H, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, ATM-4E and ATM-35E (all from Shin-Nakamura Chemical Co., Ltd.); KAYARAD™ DPEA-12, PEG400DA, THE-330 and RP-1040 (all from Nippon Kayaku Co., Ltd.); M-210 and M-350 (from Toagosei Co., Ltd.); KAYARAD™ DPHA, NPGDA and PET30 (Nippon Kayaku Co., Ltd.); and NK Ester A-DPH, A-TMPT, A-DCP, A-HD-N, TMPT, DCP, NPG and HD-N (all from Shin-Nakamura Chemical Co., Ltd.).

The compound containing blocked isocyanate groups is a compound having on the molecule at least two blocked isocyanate groups, i.e., isocyanate groups (—NCO) that have been blocked with a suitable protecting group, and in which, upon exposure of the compound to an elevated temperature during heat curing, the protecting groups (blocking moieties) are removed by thermal dissociation and the isocyanate groups that form as a result induce crosslinking reactions with the hyperbranched polymer of the invention. This compound is exemplified by compounds having on the molecule at least two groups of the following formula (which groups may be the same or may each differ).

[Chemical Formula 14]

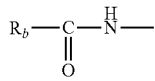

In the formula, $R_b$ is an organic group on the blocking moiety.

Such a compound can be obtained by, for example, reacting a suitable blocking agent with a compound having at least two isocyanate groups on the molecule.

Illustrative examples of compounds having at least two isocyanate groups on the molecule include polyisocyanates such as isophorone diisocyanate, 1,6-hexamethylene diisocyanate, methylenebis(4-cyclohexyl isocyanate) and trimethylhexamethylene diisocyanate, and also dimers and trimers thereof, as well as the reaction products of these with diols, triols, diamines or triamines.

Illustrative examples of the blocking agent include alcohols such as methanol, ethanol, isopropanol, n-butanol, 2-ethoxyhexanol, 2-N,N-dimethylaminoethanol, 2-ethoxyethanol and cyclohexanol; phenols such as phenol, o-nitrophenol, p-chlorophenol, and o-, m- or p-cresol; lactams such as ε-caprolactam; oximes such as acetone oxime, methyl ethyl ketone oxime, methyl isobutyl ketone oxime, cyclohexanone oxime, acetophenone oxime and benzophenone oxime; pyrazoles such as pyrazole, 3,5-dimethylpyrazole and 3-methylpyrazole; and thiols such as dodecanethiol and benzenethiol.

The compound containing blocked isocyanate groups may also be acquired as a commercial product, illustrative examples of which include B-830, B-815N, B-842N, B-870N, B-874N, B-882N, B-7005, B7030, B-7075 and B-5010 (all from Mitsui Chemicals Polyurethane, Inc.); Duranate® 17B-60PX, TPA-B80E, MF-B60X, MF-K60X and E402-B80T (all from Asahi Kasei Chemicals Corporation); and KarenzMOI-BM™ (Showa Denko KK).

Compounds having isocyanate groups are exemplified by the above-described compounds having two or more isocyanate groups on the molecule, although isocyanurate-type polyfunctional isocyanate compounds are especially preferred. Such compounds too are readily available as commercial products, illustrative examples of which include Duranate® 24A-100, 22A-75P, 21S-75E, TPA-100, TKA-100, MFA-75B, MHG-80B, TLA-100, TSE-100, TSA-100, TSS-100, TSE-100, P301-75E, E402-80B, E405-70B, AE700-100, D101, D201 and A201H.

Aminoplast compounds are compounds which have at least two methoxymethylene groups on the molecule. Upon exposure to an elevated temperature during heat curing, crosslinking reactions proceed by way of demethanolization/condensation reactions with the hyperbranched polymer of the invention.

Illustrative examples of melamine compounds include the Cymel® series, such as hexamethoxymethylmelamine (Cymel® 303), tetrabutoxymethylglycoluril (Cymel® 1170) and tetramethoxymethylbenzoguanamine (Cymel® 1123) (all from Nihon Cytec Industries, Inc.); and the Nikalac® series, including the methylated melamine resins Nikalac® MW-30HM, MW-390, MW-100LM and MX-750LM, and the methylated urea resins Nikalac® MX-270, MX-280 and MX-290 (all from Sanwa Chemical Co., Ltd.).

Oxetane compounds are compounds which have at least two oxetanyl groups on the molecule. Upon exposure to an elevated temperature during heat curing, crosslinking reactions proceed by way of addition reactions with the hyperbranched polymer of the invention.

Examples of compounds having oxetane groups include the oxetane group-bearing compounds OXT-221, OX-SQ-H and OX-SC (from Toagosei Co., Ltd.).

Phenoplast compounds are compounds which have at least two hydroxymethylene groups on the molecule. Upon exposure to an elevated temperature during heat curing, crosslinking reactions proceed by way of dehydration/condensation reactions with the hyperbranched polymer of the invention.

Illustrative examples of phenoplast compounds include 2,6-dihydroxymethyl-4-methylphenol, 2,4-dihydroxymethyl-6-methylphenol, bis(2-hydroxy-3-hydroxymethyl-5-methylphenyl)methane, bis(4-hydroxy-3-hydroxymethyl-5-methylphenyl)methane, 2,2-bis(4-hydroxy-3,5-dihydroxymethylphenyl)propane, bis(3-formyl-4-hydroxyphenyl)methane, bis(4-hydroxy-2,5-dimethylphenyl)formylmethane and α,α-bis(4-hydroxy-2,5-dimethylphenyl)-4-formyltoluene.

The phenoplast compound may also be acquired as a commercial product, illustrative examples of which include 26DMPC, 46DMOC, DM-BIPC-F, DM-BIOC-F, TM-BIP-A, BISA-F, BI25X-DF and BI25X-TPA (all from Asahi Organic Chemicals Industry Co., Ltd.).

These crosslinking agents may be used singly or two or more may be used in combination. The amount of crosslinking agent used per 100 parts by weight of the hyperbranched polymer is preferably from 1 to 100 parts by weight. From the standpoint of the solvent resistance, the lower limit is preferably 10 parts by weight, and more preferably 20 parts by weight. From the standpoint of control of the refractive index, the upper limit is preferably 50 parts by weight, and more preferably 30 parts by weight.

When a crosslinking agent is used, the crosslinking agent and the reactive active hydrogen groups on the hyperbranched polymer react, making it possible to achieve such advantageous effects as increasing the film density, improving the heat resistance and enhancing the thermal relaxation properties.

Including inorganic fine particles in the film-forming composition of the invention is advantageous for further increasing the hardness of the film obtained therefrom.

No particular limitation is imposed on the inorganic fine particles, although oxides, sulfides and nitrides of one, two or more metals selected from the group consisting of beryllium, aluminum, silicon, titanium, vanadium, iron, copper, zinc, yttrium, zirconium, niobium, molybdenum, indium, tin, antimony, tantalum, tungsten, lead, bismuth and cerium are preferred. Oxides of these metals are especially preferred.

The inorganic fine particles may be used singly, or two or more may be used in combination.

Illustrative examples of metal oxides include $Al_2O_3$, ZnO, $TiO_2$, $ZrO_2$, $Fe_2O_3$, $Sb_2O_5$, BeO, ZnO, $SnO_2$, $CeO_2$, $SiO_2$ and $WO_3$.

Using a plurality of metal oxides as a complex oxide is also effective. As used herein, "complex oxide" refers to what is obtained by mixing together two or more types of inorganic oxides in the fine particle production stage. Illustrative examples of complex oxides include complex oxides of $TiO_2$ and $ZrO_2$; complex oxides of $TiO_2$, $ZrO_2$ and $SnO_2$; and complex oxides of $ZrO_2$ and $SnO_2$.

It is also possible for the metal oxide to be a compound of the above metals. Illustrative examples include $ZnSb_2O_6$, $BaTiO_3$, $SrTiO_3$ and $SrSnO_3$. Such compounds may be used singly or as mixtures of two or more thereof. Use in admixture with the above oxides is also possible.

Although the particle diameter of the above inorganic fine particles is not particularly limited, to further increase dispersibility within the dispersion, it is desirable for the particle diameter of primary particles to be from 2 to 50 nm, and preferably from 5 to 15 nm. The particle diameter of primary particles is a value observed with a scanning electron microscope.

When the above inorganic fine particles are used, the fine particles may be used directly as is or they may be used in a colloidal state (as colloidal particles) obtained by first dispersing the fine particles in water or an organic solvent.

In addition, the inorganic fine particles may be inorganic particles which have been treated with silicon oxide, an organosilicon compound, an organometallic compound or the like.

Here, "treated with silicon oxide" refers to growing silicon oxide fine particles by a known method on the surfaces of the fine particles in a dispersion containing inorganic fine particles. "Treated with an organosilicon compound or an organometallic compound" refers to adding these compounds to a dispersion containing inorganic fine particles, and then stirring under applied heat.

Exemplary organosilicon compound include silane coupling agents and silanes. Illustrative examples of silane coupling agents include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethylditriethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropylmethyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide and 3-isocyanatopropyltriethoxysilane.

Illustrative examples of silanes include methyltrichlorosilane, dimethyldichlorosilane, trimethylchlorosilane, phenyltrichlorosilane, methyltrimethoxysilane, dimethyldimethoxysilane, phenyltrimethoxysilane, methyltriethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, decyltrimethoxysilane, trifluoropropyltrimethoxysilane and hexamethyldisilazane.

Exemplary organometallic compounds include titanate coupling agents and aluminate coupling agents. Illustrative examples of titanate coupling agents include Plenact KR TTS, KR 46B, KR 38B, KR 138S, KR 238S, KR 338X, KR 44, KR 9SA, KR ET5 and KR ET (all from Ajinomoto Fine-Techno Co., Inc.). An illustrative example of an aluminum coupling agent is Plenact AL-M (Ajinomoto Fine-Techno Co., Inc.).

These organosilicon compounds and organometallic compounds are used in an amount of preferably from 2 to 100 parts by weight per 100 parts by weight of the inorganic fine particles.

Metal oxide colloidal particles can be produced by a known method, such as an ion exchange process, a peptization process, a hydrolysis process or a reaction process.

Examples of ion exchange processes include methods in which an acidic salt of the metal is treated with a hydrogen-form ion-exchange resin, and methods in which a basic salt of the metal is treated with a hydroxide-form anion-exchange resin.

Examples of peptization processes include methods in which an acidic salt of the metal is neutralized with a base, methods in which an alkoxide of the metal is hydrolyzed, and methods in which a basic salt of the metal is hydrolyzed under heating after which the unwanted acid is removed.

Examples of reaction processes includes methods in which a powder of the metal is reacted with an acid.

The content of inorganic fine particles in the composition should be in a range that does not detract from the dispersibility of the final varnish obtained, and may be controlled in accordance with the target refractive index, transparency and heat resistance of the film to be produced.

For example, letting the amount of the triazine ring-containing hyperbranched polymer (solids basis) be 100 parts by weight, the inorganic fine particles may be added in the range of from 0.1 to 1,000 parts by weight, preferably from 1 to 500 parts by weight, and, to maintain the film quality and obtain a stable refractive index, more preferably from 10 to 300 parts by weight.

Ingredients other than the above may also be added in any step during preparation of the inventive composition.

The film-forming composition of the invention, when applied onto a base material and subsequently heated where necessary, is able to form the desired film.

Any suitable method may be used for applying the composition, such as spin coating, dipping, flow coating, inkjet printing, spraying, bar coating, gravure coating, slit coating, roll coating, transfer printing, brush coating, blade coating and air knife coating.

Illustrative examples of the base material include silicon, indium-tin oxide (ITO)-coated glass, indium zinc oxide (IZO)-coated glass, polyethylene terephthalate (PET), plastic, glass, quartz and ceramic. Use can also be made of a flexible base material having pliability.

The temperature at which baking is carried out in order to evaporate the solvent is not subject to any particular limitation. For example, baking may be carried out at between 40° C. and 400° C. In such cases, to achieve more uniform film formability or to induce the reaction to proceed on the base material, temperature change may be carried out in two or more stages.

The baking process is not particularly limited. For example, solvent evaporation may be effected using a hot plate or an oven, and under a suitable atmosphere, such as in open air, in nitrogen or another inert gas, or in a vacuum.

As for the bake temperature and time, conditions which are compatible with the processing steps for the target electronic device should be selected. Bake conditions such that the physical values of the resulting film conform to the required characteristics of the electronic device should be selected.

The thickness of the resulting film made of the inventive composition is not particularly limited. However, given that one feature of this invention is the ability to form a thick film, the film thickness may be set to at least 2 μm, may further be set to at least 2.5 μm, or may even be set to at least 3 μm.

Because the film of the invention is able to achieve a high heat resistance, high transparency, high refractive index, high solubility, low volume shrinkage and high light resistance, it can be advantageously used as a component in the fabrication of electronic devices such as liquid-crystal displays, organic electroluminescent (EL) displays, optical semiconductor (LED) devices, solid-state image sensors, organic thin-film solar cells, dye-sensitized solar cells and organic thin-film transistors (TFT), or as an optical component.

Where necessary, other resins (thermoplastic resins or thermoset resins) may be included in the inventive composition.

Illustrative, non-limiting, examples of such resins include the following thermoplastic resins: polyolefin resins such as polyethylene (PE), polypropylene (PP), ethylene-vinyl acetate copolymers (EVA) and ethylene-ethyl acrylate copolymers (EEA); cyclic olefin resins; polystyrene resins such as polystyrene (PS), high-impact polystyrene (HIPS), acrylonitrile-styrene copolymers (AS), acrylonitrile-butadiene-styrene copolymers (ABS) and methyl methacrylate-styrene copolymers (MS); polycarbonate resins; vinyl chloride resins; polyamide resins; polyimide resins; (meth)acrylic resins such as polymethyl methacrylate (PMMA); polyester resins such as polyethylene terephthalate (PET), polybutylene terephthalate, polyethylene naphthalate, polybutylene naphthalate, polylactic acid (PLA), poly-3-hydroxybutyric acid, polycaprolactone, polybutylene succinate and polyethylene succinate/adipate; polyphenylene ether resins; modified polyphenylene ether resins; polyacetal resins; polysulfone resins; polyphenylene sulfide resins; polyvinyl alcohol resins; polyglycolic acid; modified starch; cellulose acetate and cellulose triacetate; chitin and chitosan; and lignin. Other exemplary resins include also thermoset resins such as phenolic resins, urea resins, melamine resins, unsaturated polyester resins, polyurethane resins and epoxy resins.

These resins may be used singly or two or more may be used in combination. The amount in which such resins are used per 100 parts by weight of the hyperbranched polymer is preferably from 1 to 10,000 parts by weight, and more preferably from 1 to 1,000 parts by weight.

For example, a composition with a (meth)acrylic resin may be obtained by including a (meth)acrylate compound in the composition and polymerizing the (meth)acrylate compound.

Illustrative examples of (meth)acrylate compounds include methyl (meth)acrylate, ethyl (meth)acrylate, ethylene glycol di(meth)acrylate, tetraethylene glycol di(meth)acrylate, polyethylene glycol di(meth)acrylate, propylene glycol di(meth)acrylate, polypropylene glycol di(meth)acrylate, 1,4-butanediol di(meth)acrylate, 1,6-hexanediol di(meth)acrylate, neopentylglycol di(meth)acrylate, trimethylolpropane trioxyethyl (meth)acrylate, tricyclodecane dimethanol di(meth)acrylate, tricyclodecanyl di(meth)acrylate, trimethylolpropane trioxypropyl (meth)acrylate, tris-2-hydroxyethyl isocyanurate tri(meth)acrylate, tris-2-hydroxyethyl isocyanurate di(meth)acrylate, 1,9-nonanediol di(meth)acrylate, pentaerythritol di(meth)acrylate, glycerol methacrylate acrylate, pentaerythritol tri(meth)acrylate, trimethylolpropane trimethacrylate, allyl (meth)acrylate, vinyl (meth)acrylate, epoxy (meth)acrylate, polyester (meth) acrylate and urethane (meth)acrylate.

The polymerization of these (meth)acrylate compounds may be carried out by light irradiation or heating in the presence of a photoradical initiator or a thermal radical initiator.

Examples of photoradical initiators include acetophenones, benzophenones, Michler's benzoyl benzoate, amyloxime ester, tetramethylthiuram monosulfide and thioxanthones.

Photocleavable photoradical initiators are especially preferred. Photocleavable photoradical initiators are listed on page 159 of Saishin UV K•ka Gijutsu [Recent UV Curing Technology] (publisher, K. Takausu; published by Gijutsu Joho Kyokai KK; 1991).

Examples of commercial photoradical initiators include those available from BASF under the trade names Irgacure 184, 369, 651, 500, 819, 907, 784 and 2959, the trade names CGI1700, CGI1750, CGI1850 and CG24-61, the trade names Darocur 1116 and 1173, and the trade name Lucirin TPO; that available from UCB under the trade name Ubecryl P36; and those available from the Fratelli Lamberti Company under the trade names Esacure KIP150, KIP65LT, KIP100F, KT37, KT55, KT046 and KIP75/B.

The photoradical initiator is used in the range of preferably from 0.1 to 15 parts by weight, and more preferably from 1 to 10 parts by weight, per 100 parts by weight of the (meth)acrylate compound.

The solvent used in polymerization is exemplified by the same solvents as those mentioned above for the film-forming composition.

EXAMPLES

The invention is illustrated more fully below by way of Working Examples and Comparative Examples, although the invention is not limited by these Examples. The instruments used for measurement in the Examples were as follows.
[$^1$H-NMR]
　　Instruments: JEOL-ECX300 (300 MHz)
　　Solvent used in measurement: DMSO-d6
　　Reference material: Tetramethylsilane (TMS) ($\delta$=0.0 ppm)
[GPC]
　　Instrument: Shimadzu SPD-10A VP
　　Columns: Shodex K-804L, K-805L
　　Column temperature: 60° C.
　　Solvent: NMP
　　Detector: UV (254 nm)
　　Calibration curve: polystyrene standard
[Ultraviolet-Visible Spectrophotometer]
　　Instrument: Shimadzu UV-3600 (Shimadzu Corporation)
[Ellipsometer]
　　Instrument: VASE multiple incident angle spectroscopic ellipsometer (JA Woollam Japan)
[Prism Coupler]
　　Instrument: Metricon Model 2010
[Thermogravimetric/Differential Thermal Analyzer (TG-DTA)]
　　Instrument: TG-8120 (Rigaku Corporation)
　　Temperature ramp-up rate: 10° C./min
　　Measurement temperatures: 25° C. to 750° C.
[Pencil Hardness]
　　Instrument: Electrical Pencil Hardness Scratch Tester (Yasuda Seiki Seisakusho, Ltd.)
　　Pencil: 6B-6H (Mitsubishi Pencil Co., Ltd.)
　　Load: 750 g
　　Angle: 45°
　　Speed: 4.0 m/min
[Surface Profiler]
　　Instrument: Ellipsometer (Kosaka Laboratory, Ltd.)
[Optical Microscope]
　　Instrument: BX51 (Olympus Corporation)

[1] Synthesis of Triazine Ring-Containing Hyperbranched Polymers

Example 1

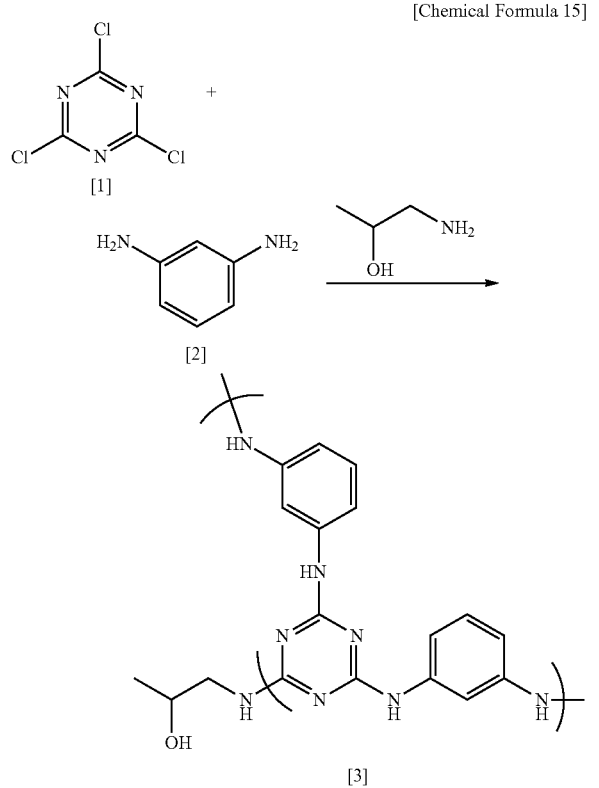

Under a nitrogen atmosphere, 8.40 g (0.077 mol) of m-phenylenediamine [2] (DuPont) was dissolved in 43.91 g of dimethylacetamide (DMAc) in a 200 mL flask, and the solution was held at −10° C. To this was added dropwise a solution of 13.07 g (0.07 mol) of 2,4,6-trichloro-1,3,5-triazine [1] (Evonik Degussa) in DMAc (12.91 g) which had been held at −10° C. Thirty minutes following the completion of dropwise addition, the resulting solution was added dropwise to DMAc held at 85° C. within a 500 mL flask, thereby commencing polymerization. Sixty minutes following the completion of dropwise addition, 40.57 g (0.44 mol) of DL-2-aminopropanol (Tokyo Chemical Industry) was added dropwise. Sixty minutes later, the temperature of the flask was returned to room temperature, following which the reaction mixture was added to 1,274 g of ion-exchanged water to which 42.50 g of 28% ammonia water (Junsei Chemical Co., Ltd.) had been added, thereby effecting precipitation and stopping polymerization. The precipitate was filtered, and the solids were collected and then dissolved in 94.5 g of tetrahydrofuran (THF). This THF solution was added to 600 g of ion-exchanged water and re-precipitated, following which the precipitate was filtered and dried at 150° C. for 8 hours, yielding the target polymeric compound [3] (referred to below as "HB-TmD-OH").

FIG. 1 shows the measured $^1$H-NMR spectrum for HB-TmD-OH. The HB-TmD-OH thus obtained is a compound having structural units of formula (1). The polystyrene-equivalent weight-average molecular weight Mw of HB-TmD-OH, as measured by GPC, was 13,600, and the polydispersity Mw/Mn was 1.52.

Measurement of Refractive Index

The resulting HB-TmD-OH, 0.1 g, was dissolved in 0.86 g of cyclohexanone and 0.04 g of ion-exchanged water, giving a clear, light yellow-colored solution. Using a spin coater, this solution was spin-coated onto a glass substrate at 200 rpm for 5 seconds and at 1,000 rpm for 30 seconds, following which the solvent was removed by a 1-minute bake at 100° C. and a 5-minute bake at 250° C., thereby giving a film (thickness, 590 nm). The refractive index of the resulting film was measured, whereupon the refractive index at 550 nm was 1.7450.

Measurement of Transmittance

Figure 2:
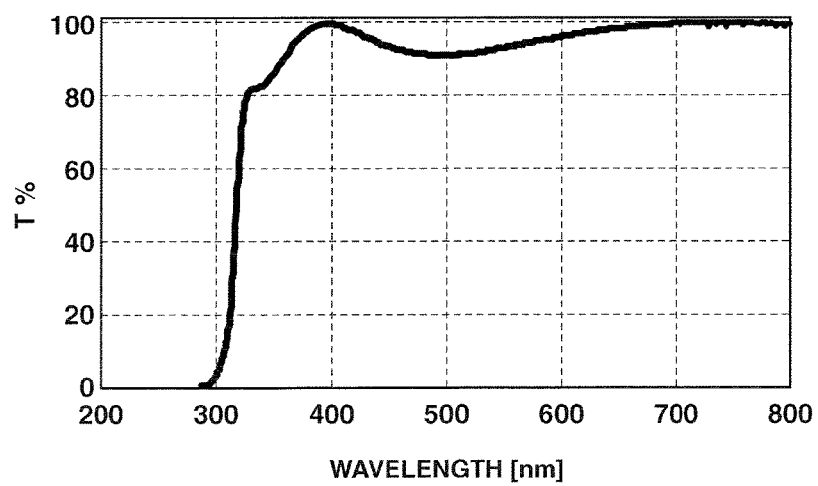
FIG. 2 is a graph showing the transmittance of the film produced in Example 1.

The resulting HB-TmD-OH, 0.06 g, was dissolved in 1.09 g of cyclohexanone and 0.04 g of ion-exchanged water, giving a clear, light yellow colored solution. Using a spin coater, the resulting solution was spin-coated onto a quartz substrate at 200 rpm for 5 seconds and at 800 rpm for 30 seconds, following which the solvent was removed by a 1-minute bake at 100° C. and a 5-minute bake at 250° C., thereby giving a film. The transmittance of the resulting film was measured. The result is shown in FIG. 2.

Heat-Resistance Test

Figure 3:
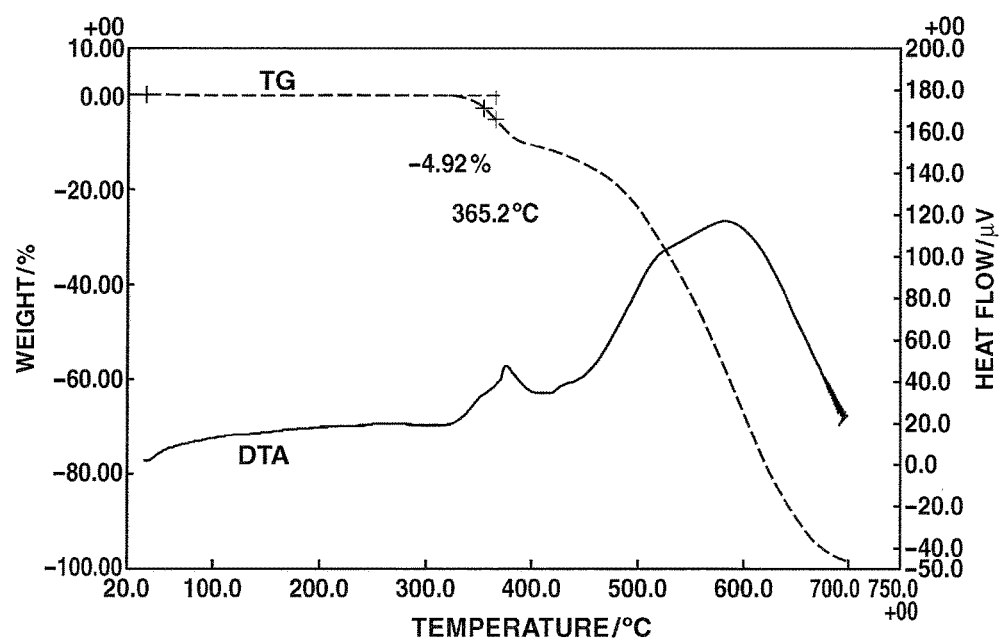
FIG. 3 shows the TG-DTA measurement results for Hyperbranched Polymer [3] obtained in Example 1.

The resulting HB-TmD-OH, 3.620 mg, was added to a platinum pan, and measurement was carried out by TG-DTA at a ramp-up rate of 15° C./min. The 5% weight loss temperature was 365° C. The results are shown in FIG. 3.

Comparative Example 1

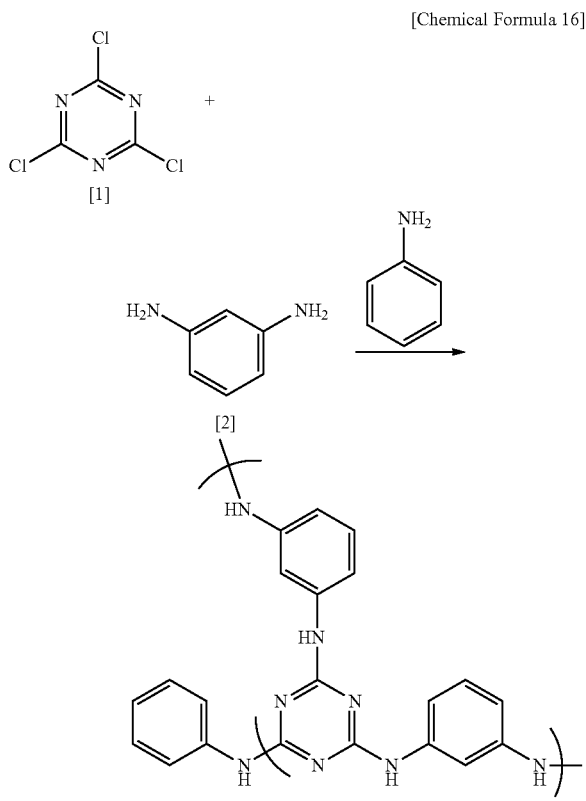

Under a nitrogen atmosphere, 13.52 g (0.125 mol) of m-phenylenediamine [2] (DuPont) was dissolved in 99.14 g of DMAc in a 200 mL flask, and the solution was held at −10° C. To this was added dropwise a solution of 18.44 g (0.1 mol) of 2,4,6-trichloro-1,3,5-triazine[1] (Evonik Degussa) in DMAc (66.09 g) which had been held at −10° C., following which 3.17 g (0.034 mol) of aniline (Junsei Chemical Co., Ltd.) was added dropwise. Thirty minutes following the completion of dropwise addition, the reaction mixture was added dropwise to 135.18 g of DMAc held at 85° C. in a 500 mL flask, thereby commencing polymerization. Next, 120 minutes following the completion of dropwise addition, 24.77 g (0.266 mol) of aniline (Junsei Chemical Co., Ltd.) was added dropwise. After another 180 minutes, the flask temperature was returned to room temperature, following which the reaction mixture was added to 922 g of ion-exchanged water to which 60.71 g of 28% ammonia water (Junsei Chemical Co., Ltd.) had been added, thereby effecting precipitation and stopping polymerization. The precipitate was filtered and the solids were collected, following which 258.2 g of THF and 60.71 g of ammonia water were added, and purification by liquid-liquid extraction was carried out. The THF solution making up the bottom phase was drawn off, THF was added to a total weight of 179 g, then 60.71 g of ammonia water was added and purification by liquid-liquid extraction was repeated. The THF solution making up the bottom phase was again drawn off, THF was added to a total weight of 205 g, and the resulting THF solution was added to a solution of 94.11 g of ammonia water and 1,381 g of ion-exchanged water, thereby effecting re-precipitation. The precipitate was filtered, then dried at 150° C. for 20 hours, yielding the target polymeric compound [4] (referred to below as "HB-TmDA").

The polystyrene-equivalent weight-average molecular weight Mw of the resulting HB-TmDA, as measured by GPC, was 14,300, and the polydispersity Mw/Mn was 7.37.

[2] Film-Forming Composition 1 (Thermosetting Composition)

Example 2

A solution (referred to below as "HB-TmD-OHS20") having a solid content of 15 wt % was prepared by dissolving 0.2 g of the HB-TmD-OH obtained in Example 1, 0.04 g of Duranate TSE-100 (Asahi Kasei Chemicals Corporation) and 0.0001 g of Megafac F-554 (DIC Corporation) in 1.35 g of propylene glycol monomethyl ether (PGME).

Example 3

A solution (referred to below as "HB-TmD-OHS40") having a solid content of 15 wt % was prepared by dissolving 0.2 g of the HB-TmD-OH obtained in Example 1, 0.08 g of Duranate TSE-100 (Asahi Kasei Chemicals Corporation) and 0.0001 g of Megafac F-554 (DIC Corporation) in 1.59 g of PGME.

Comparative Example 2

A solution (referred to below as "HB-TmDAV") having a solid content of 15 wt % was prepared by dissolving 5.0 g of the HB-TmDA obtained in Comparative Example 1, 1.0 g of B-882N (Mitsui Chemicals, Inc.) and 0.25 g of Megafac F-554 (DIC Corporation) in 34 g of a cyclohexanone/ion-exchanged water (96/4) mixed solution.

[3] Film Production 1 (Thermosetting Test)

Example 4

The HB-TmD-OHS20 prepared in Example 2 was spin-coated onto a glass substrate to a target of 1,000 nm, after which a 1-minute bake at 100° C. and a 5-minute bake at 150° C. were carried out, thereby forming a film.

Example 5

Aside from setting the bake temperature in the second bake step to 200° C., a film was formed in the same way as in Example 4.

Example 6

Aside from setting the bake temperature in the second bake step to 250° C., a film was formed in the same way as in Example 4.

Example 7

Aside from using the HB-TmD-OHS40 prepared in Example 3, a film was formed in the same way as in Example 4.

Example 8

Aside from setting the bake temperature in the second bake step to 200° C., a film was formed in the same way as in Example 7.

Example 9

Aside from setting the bake temperature in the second bake step to 250° C., a film was formed in the same way as in Example 7.

Comparative Example 3

Aside from using the HB-TmDAV prepared in Comparative Example 2, a film was formed in the same way as in Example 4.

Comparative Example 4

Aside from setting the bake temperature in the second bake step to 250° C., a film was formed in the same way as in Comparative Example 3.

Measurement of Refractive Index and Film Thickness

The refractive indices and film thicknesses of the films produced in above Examples 4 to 9 and Comparative Examples 3 and 4 were measured with an ellipsometer. The results are shown in Table 1.

Solvent Resistance Test

The films produced in above Examples 4 to 9 and Comparative Examples 3 and 4 were immersed in PGME for 5 minutes, after which the PGME was removed by spray drying. The film thickness was then measured and the solvent resistance was evaluated. The residual film ratio results are also shown in Table 1.

Pencil Hardness Test

Pencil hardness tests were carried out on the films obtained in Examples 4 to 9 and Comparative Examples 3 and 4. The results are shown in Table 1.

TABLE 1

|  | Film thickness (nm) | Refractive index 550 nm | Residual film ratio (%) | Pencil hardness |
|---|---|---|---|---|
| Example 4 | 1387 | 1.733 | 98 | HB |
| Example 5 | 1331 | 1.717 | 99 | HB |
| Example 6 | 1339 | 1.693 | 97 | HB |
| Example 7 | 1216 | 1.688 | 99 | HB |
| Example 8 | 1175 | 1.688 | 100 | F |
| Example 9 | 1170 | 1.676 | 100 | F |
| Comparative Example 3 | 723 | 1.747 | — | — |
| Comparative Example 4 | 778 | 1.749 | 100 | <6B |

As shown in Table 1, it is apparent that, in the examples in which a hyperbranched polymer having reactive active hydrogen groups on a terminal triazine ring was combined with a crosslinking agent, a cured film having a good solvent resistance can be obtained even at the low temperature of 150° C.

By contrast, in Comparative Example 3 in which a hyperbranched polymer lacking such a reactive groups was used, it is apparent that, with curing at 150° C., a cured film which exhibits solvent resistance has not been obtained.

Moreover, because the films obtained in Examples 4 to 9 are able to densely crosslink due to active hydrogen groups which function as crosslink points, the hardness appears to be enhanced compared with the film in Comparative Example 4 which lacks such functional groups.

[4] Film-Forming Compositions 2

Thick Film-Forming Thermosetting Compositions

Example 10

A solution (referred to below as "HB-TmD-OHT20") having a solid content of 20 wt % was prepared by dissolving 1.0 g of the HB-TmD-OH obtained in Example 1, 0.2 g of Duranate TPA-100 (Asahi Kasei Chemicals Corporation) and 0.0005 g of Megafac F-554 (DIC Corporation) in 4.8 g of PGME.

Example 11

A solution (referred to below as "HB-TmD-OHT40") having a solid content of 20 wt % was prepared by dissolving 1.0 g of the HB-TmD-OH obtained in Example 1, 0.4 g of Duranate TPA-100 (Asahi Kasei Chemicals Corporation) and 0.0005 g of Megafac F-554 (DIC Corporation) in 5.6 g of PGME.

Example 12

A solution (referred to below as "HB-TmD-OHC20") having a solid content of 20 wt % was prepared by dissolving 1.0 g of the HB-TmD-OH obtained in Example 1, 0.2 g of Cymel 303 (MT Aquapolymer, Inc.) and 0.0005 g of Megafac F-554 (DIC Corporation) in 4.8 g of PGME.

Example 13

A solution (referred to below as "HB-TmD-OHC40") having a solid content of 20 wt % was prepared by dissolving 1.0 g of the HB-TmD-OH obtained in Example 1, 0.4 g of Cymel 303 (MT Aquapolymer, Inc.) and 0.0005 g of Megafac F-554 (DIC Corporation) in 5.6 g of PGME.

Example 14

A solution (referred to below as "HB-TmD-OHB20") having a solid content of 20 wt % was prepared by dissolving 1.0 g of HB-TmD-OH obtained in Example 1, 0.2 g of Duranate TPA-B80E (Asahi Kasei Chemicals Corporation) and 0.0005 g of Megafac F-554 (DIC Corporation) in 4.8 g of PGME.

Example 15

A solution (referred to below as "HB-TmD-OHB40") having a solid content of 20 wt % was prepared by dissolving 1.0 g of the HB-TmD-OH obtained in Example 1, 0.4 g of Duranate TPA-B80E (Asahi Kasei Chemicals Corporation) and 0.0005 g of Megafac F-554 (DIC Corporation) in 5.6 g of PGME.

Comparative Example 5

A solution (referred to below as "HB-TmDAV") having a solid content of 20 wt % was prepared by dissolving 11.0 g of the HB-TmDA obtained in Comparative Example 1 in 42.2 g of cyclohexanone and 1.76 g of ion-exchanged water.

[5] Film Production 2 (Thick Film Production)

Example 16

The HB-TmD-OHT20 prepared in Example 10 was spin-coated at 300 rpm onto a glass substrate, after which a hot plate was used to carry out a 5-minute bake at 100° C. then a 5-minute bake at 250° C., thereby forming a film.

Example 17

Aside from using the HB-TmD-OHT40 prepared in Example 11, a film was formed in the same way as in Example 16.

Example 18

Aside from using the HB-TmD-OHC20 prepared in Example 12, a film was formed in the same way as in Example 16.

Example 19

Aside from using the HB-TmD-OHC40 prepared in Example 13, a film was formed in the same way as in Example 16.

Example 20

Aside from using the HB-TmD-OHB20 prepared in Example 14, a film was formed in the same way as in Example 16.

Example 21

Aside from using the HB-TmD-OHB40 prepared in Example 15, a film was formed in the same way as in Example 16.

Comparative Example 6

Aside from using the HB-TmDAV prepared in Comparative Example 5, a film was formed in the same way as in Example 16.

Measurement of Refractive Index

The refractive indices of the films produced in above Examples 16 to 21 and Comparative Example 6 were measured with a prism coupler. The results are shown in Table 2.

Measurement of Film Thickness and Examination of Cracking

A cut down to the substrate was made with a spatula in the respective films obtained in Examples 16 to 21 and in Comparative Example 6, and the depth of the cut was measured. The results are shown in Table 2.

The films were examined under an optical microscope to determine whether cracks are present. Cases in which no cracks are present were rated as "Good" and cases in which cracks are present were rated as "NG."

TABLE 2

|  | Film thickness (μm) | Refractive index 633 nm | Cracks |
| --- | --- | --- | --- |
| Example 16 | 5.89 | 1.688 | Good |
| Example 17 | 5.42 | 1.664 | Good |
| Example 18 | 3.79 | 1.702 | Good |
| Example 19 | 3.17 | 1.681 | Good |
| Example 20 | 4.30 | 1.694 | Good |
| Example 21 | 2.70 | 1.681 | Good |
| Comparative Example 6 | — | — | NG |

As shown in Table 2, it was possible in Examples 16 to 21 to produce films having a thickness of 2.7 μm or more, and these films were confirmed to be high refractive index materials in which cracks do not form.

When a film have a thickness of at least 2 μm was produced in Comparative Example, cracks arose, from which it was apparent that this coating material is unsuitable for thick film formation.

[6] Film-Forming Composition 3

ZrO$_2$-Containing Thermosetting Composition

Example 22

A solution (referred to below as "HB-TmD-OHZ") having a solid content of 20 wt % was prepared by dissolving 0.2 g of the HB-TmD-OH obtained in Example 1, 0.67 g of an organozirconia sol (Nanouse® OZ-S30K-AC, from Nissan Chemical Industries, Ltd.) and 0.0001 g of Megafac F-554 (DIC Corporation) in 1.60 g of PGME.

Example 23

A solution (referred to below as "HB-TmD-OHZ40") having a solid content of 20 wt % was prepared by dissolving 0.2 g of the HB-TmD-OH obtained in Example 1, 0.67 g of an organozirconia sol (Nanouse® OZ-S30K-AC, from Nissan Chemical Industries, Ltd.), 0.04 g of Duranate TPA-100 (Asahi Kasei Chemicals Corporation) and 0.0001 g of Megafac F-554 (DIC Corporation) in 1.76 g of PGME.

[7] Film Production 3

Example 24

A film was produced by spin-coating the HB-TmD-OHZ prepared in Example 22 onto a glass substrate, first at 200 rpm for 5 seconds then at 800 rpm for 30 seconds, and subsequently using a hot plate to carry out a 1-minute bake at 100° C. then a 5-minute bake at 250° C.

Example 25

A film was produced by spin-coating the HB-TmD-OHZ40 prepared in Example 23 onto a glass substrate, first at 200 rpm for 5 seconds then at 800 rpm for 30 seconds, and subsequently using a hot plate to carry out a 1-minute bake at 100° C. then a 5-minute bake at 200° C.

Example 26

Aside from setting the bake temperature in the second step to 250° C., a film was produced in the same way as in Example 25.

Measurement of Refractive Index and Film Thickness

The refractive indices of the films produced in Examples 24 to 26 above were measured with a prism coupler, and the film thicknesses were measured with an ellipsometer. The results are shown in Table 3.

Pencil Hardness Test

Pencil hardness tests were carried out on the films obtained in Examples 24 to 26. The results are shown in Table 3.

TABLE 3

|  | Film thickness (μm) | Refractive index 633 nm | Pencil hardness |
| --- | --- | --- | --- |
| Example 24 | 0.848 | 1.701 | B |
| Example 25 | 3.12 | 1.688 | H |
| Example 26 | 3.29 | 1.696 | H |

As shown in Table 3, it was found that a high refractive index can be maintained by adding ZrO$_2$, and also that combination with a crosslinking agent enables the pencil hardness as well to be improved.

The invention claimed is:

1. A triazine ring-containing hyperbranched polymer, comprising recurring units and is capped by capping compounds consisting of one or more amino alcohols,
    wherein the recurring units are bonded only to other of the recurring units and/or capping compounds, and
    wherein the recurring units in said polymer consist of at least one recurring unit structure of formula (1)

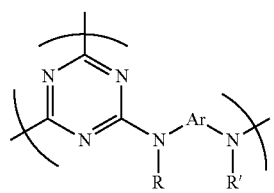

(1)

wherein R and R' are each independently a hydrogen atom, an alkyl group, an alkoxy group, an aryl group or an aralkyl group; and Ar is a divalent organic group which comprises an aromatic ring or a heterocycle or both an aromatic ring and a heterocycle.

2. The triazine ring-containing hyperbranched polymer according to claim 1, wherein the one or more amino alcohols comprise at least one alkanolamine.

3. The triazine ring-containing hyperbranched polymer according to claim 1 or 2, wherein Ar is at least one moiety selected from the group consisting of moieties of formulas (2) to (18)

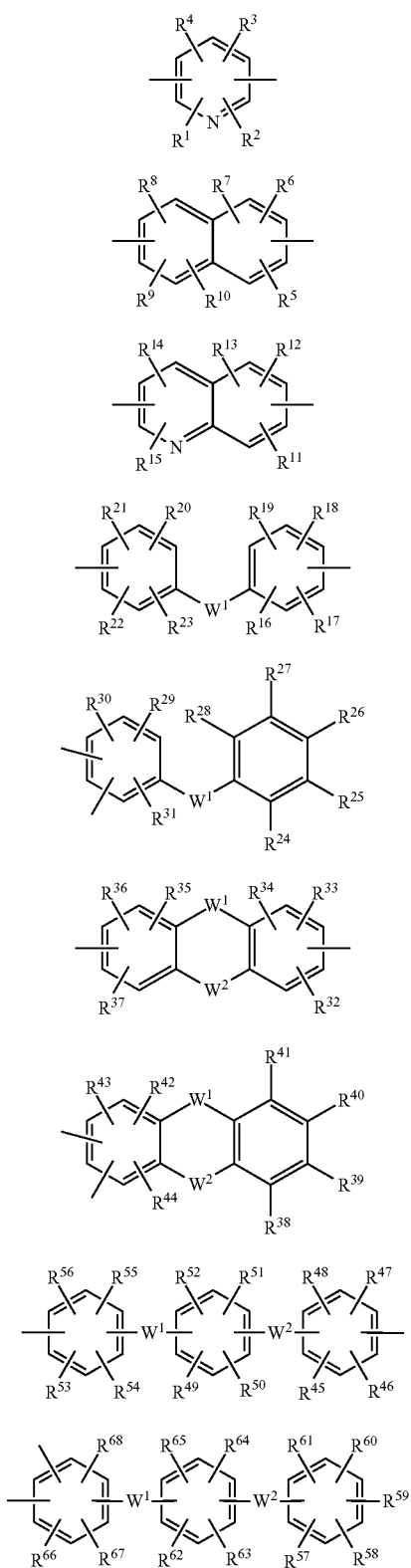

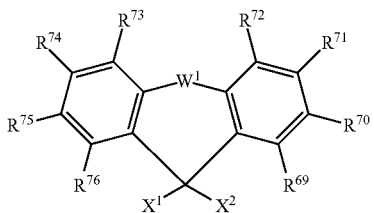

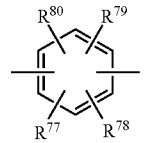

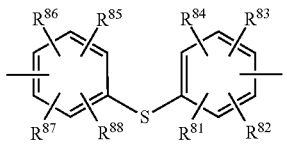

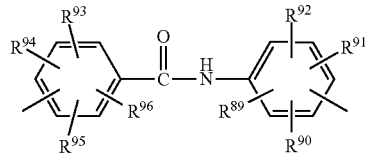

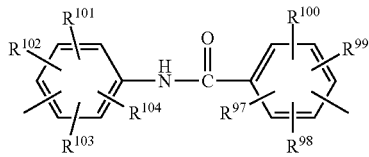

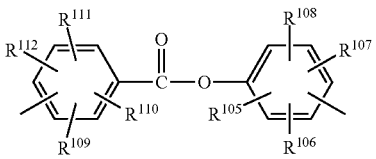

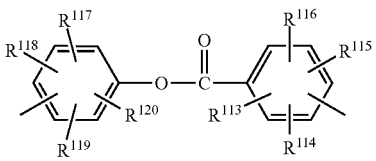

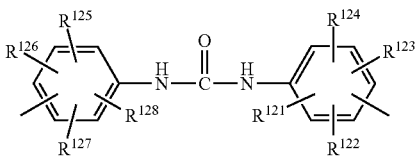

wherein $R^1$ to $R^{128}$ are each independently a hydrogen atom, a halogen atom, a carboxyl group, a sulfo group, an alkyl group of 1 to 10 carbons which may have a branched structure, or an alkoxy group of 1 to 10 carbons which may have a branched structure; $W^1$ and $W^2$ are each independently a single bond, $CR^{129}R^{130}$, $R^{129}$ and $R^{130}$ being each independently a hydrogen atom or an alkyl group of 1 to 10 carbons which may have a branched structure, with the proviso that $R^{129}$ and $R^{130}$ may together form a ring, C=O, O, S, SO, $SO_2$ or $NR^{131}$, $R^{131}$ being a hydrogen atom or an alkyl group of 1 to 10 carbons which may have a branched structure; and $X^1$ and $X^2$ are each independently a single bond, an alkylene group of 1 to 10 carbons which may have a branched structure, or a group of formula (19)

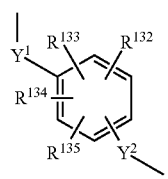

(19)

$R^{132}$ to $R^{135}$ being each independently a hydrogen atom, a halogen atom, a carboxyl group, a sulfo group, an alkyl group of 1 to 10 carbons which may have a branched structure, or an alkoxy group of 1 to 10 carbons which may have a branched structure; and $Y^1$ and $Y^2$ are each independently a single bond or an alkylene group of 1 to 10 carbons which may have a branched structure.

4. The triazine ring-containing hyperbranched polymer according to claim 3, wherein Ar has formula (12).

5. The triazine ring-containing hyperbranched polymer according to claim 1, wherein the recurring unit structure has formula (21)

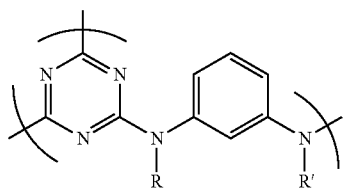

(21)

wherein R and R' are as defined in claim 1.

6. The triazine ring-containing hyperbranched polymer according to claim 5, wherein the recurring unit structure has formula (22)

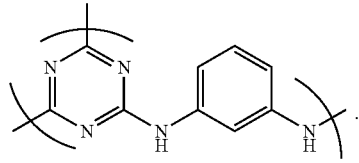

(22)

7. The triazine ring-containing hyperbranched polymer according to claim 2, wherein the at least one alkanolamine is one or more selected from the group consisting of methanolamine, ethanolamine, propanolamine, 1-amino-2-propanol, 1-amino-2-butanol, 1-amino-3-butanol and 4-amino-1-butanol.

8. A film-forming composition comprising the triazine ring-containing hyperbranched polymer of claim 1.

9. The film-forming composition according to claim 8, further comprising a crosslinking agent.

10. The film-forming composition according to claim 9, wherein the crosslinking agent is at least one compound selected from among compounds containing a blocked isocyanate group and polyfunctional isocyanate compounds.

11. The film-forming composition according to claim 8, further comprising a metal oxide.

12. The film-forming composition according to claim 11, wherein the metal oxide is $ZrO_2$.

13. A film comprising the triazine ring-containing hyperbranched polymer according to claim 1.

14. A film obtained from the film-forming composition of claim 8.

15. An optical member comprising a base material and the film of claim 13 or 14 formed on the base material.

* * * * *